Sept. 28, 1965     A. H. VINCENT     3,208,167
COMBINATION LAWN MOWER AND SNOW REMOVER
Filed June 24, 1964

INVENTOR.
ARTHUR H. VINCENT
BY
Douglas S. Johnson
Attorney

United States Patent Office 3,208,167
Patented Sept. 28, 1965

3,208,167
COMBINATION LAWN MOWER AND
SNOW REMOVER
Arthur H. Vincent, 346 Friendship Ave., Westhill,
Ontario, Canada
Filed June 24, 1964, Ser. No. 377,643
8 Claims. (Cl. 37—43)

This invention relates to a combination lawn mower and snow remover which has for its primary object the provision of apparatus which may be used for the purpose of mowing grass or for the purpose of snow removal without any adaptation.

A further object of the invention resides in the provision of a lawn mower and snow remover which is supported by the same wheels whether used as a lawn mower or a snow remover, the only adjustment of such wheels being the usual one of varying the height of the lawn mower off the ground to vary the cut of the grass.

A feature of this invention resides in the provision of a combination lawn mower and snow remover which is simple to manufacture, highly efficient in operation and is strong and durable, thereby permitting wide utilization.

These objects and feature of the invention will become apparent in the following description. A preferred embodiment is illustrated in the accompanying drawings, by way of example only, wherein.

Figure 1:
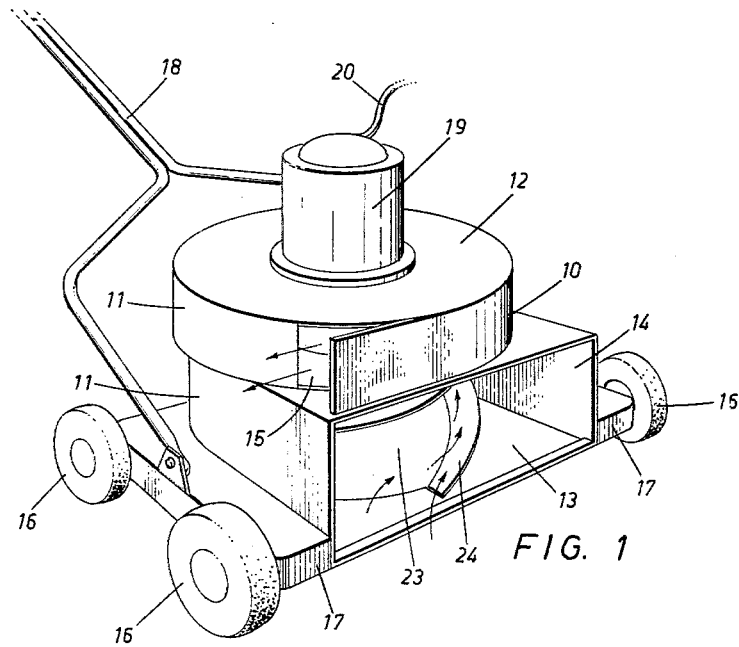
FIGURE 1 is a general view of one embodiment of the apparatus.
Figure 2:
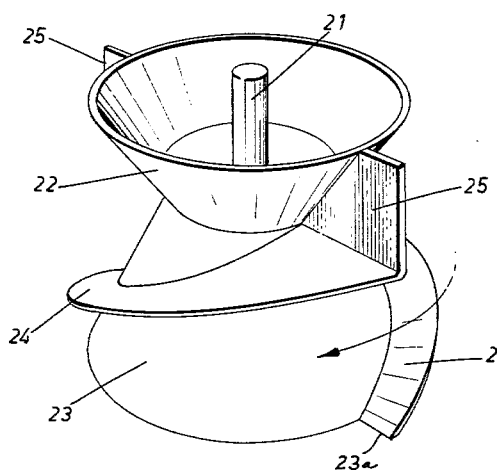
FIGURE 2 is a view of the frusto conical sections carried in the housing of the embodiment of the invention shown in FIGURE 1.

With reference to the accompanying drawings and, in particular, to FIGURE 1, the apparatus includes a housing 10 made of suitable material, e.g. sheet steel, aluminum, etc., and having a side wall 11 dimensioned so as to allow freedom of rotation of the moving parts described hereunder and contained in the housing 10. A top wall 12, again of suitable configuration, closes the top of the housing 10 and opposing the top wall 12 the base of the housing 10 is open at the bottom 13. A lower port 14 is provided in the cylindrical wall 11 of the housing 10 and at least one outlet 15 is provided in the upper part of the cylindrical wall 11 or in the top wall 12.

For safety reasons a cover, not shown, is provided to close the lower port 14 when the apparatus is used as a lawn mower, while suitable detachable flanges, not shown, are provided, positioned around the lower port 14 to facilitate the scooping action of the apparatus when used as a snow blower.

The housing 10 is mounted on wheels 16 which may be carried by suitable members 17 constructed so that the height of the housing 10 above the ground may be adjusted by well known means. A suitable handle 18 is bolted or otherwise secured to the housing 10 to provide for propulsion of the apparatus on the wheels 16 along the ground.

Secured to the end wall 12 by suitable means is a motor 19, such as an electric motor, which is connected by suitable conductors 20 to a source of electrical power, not shown.

The motor 19 is adapted to drive a shaft 21, which is substantially centrally disposed in the housing 10. Axially disposed of the shaft 21 and located within the housing 10 for free rotation is an inverted upper frusto conical member 22, which may be made from any suitable material, e.g. steel, aluminum, etc. and is preferably, though not necessarily, hollow in construction to reduce the weight of the apparatus; the base of the upper frusto conical member 22 is adjacent to the top wall 12 of the housing 10, and suitable means, e.g. ribs, not shown, are provided to connect the shaft 21 to the upper frusto conical member 22. Securely attached to the upper frusto conical member 22 and positioned below on a common axis is a lower frusto conical member 23, the base of which is in substantially the same plane as the bottom opening 13 of the housing 10.

At least one blade 24 projecting outwardly is attached in spiral manner to the outer surface of the lower frusto conical member 23. The angular relationship of the vertical axis of the lower frusto conical member 23 and a line taken from any point at the edge of the blade 24 across its upper surface to the vertical axis of the lower frusto conical member 23 is substantially constant along the length of the blade 24 and it may be selected anywhere between a position where such a line is substantially parallel to the base of the lower frusto conical member 23 and the position where it is substantially normal to the surface of the lower frusto conical member 23. Preferably the horizontal distance of the axis of the frusto conical member 23 from any point at the edge of the blade 24 remains substantially constant, i.e. the width of the blade 24 increases as it spirals upward around the lower frusto conical member 23.

A cutting edge 23a is provided in conventional manner at the lower end of the blade 24, which terminates substantially in the same plane as the base of the lower frusto conical member 23; it will be understood that additional cutters may be attached at the base of the frusto conical member 23. The upper part of the blade 24 terminates substantially in the plane common to the upper frusto conical member 22 and the lower frusto conical member 23, and is secured to a substantially vertical radial flange 25 attached to the upper frusto conical member 22; preferably the horizontal distance of any point on the vertical edge of the flange 25 from the axis of the upper frusto conical member 22 corresponds, at least, with the horizontal distance of any point on the edge of the blade 24 from the axis of the lower frusto conical member 23. Also it is preferable to have a greater clearance between the vertical edge of the flange 25 and the upper part of the housing 10 than the clearance which is required for free rotation between the edge of the blade 24 and the lower part of the housing 10, i.e. the diameter of that part of the housing 10 surrounding the flange 25 should be greater than the diameter of that part of the housing 10 surrounding the blade 24.

The operation of the apparatus will be clear; as a lawn mower it is based on the rotary action of the blade 24, the cutting edge of which mows grass to the desired height after the housing 10 has been suitably positioned above the ground by adjustment of the wheels 16 on the members 17; the grass cuttings move upwards due to the lateral force exerted by the rotation of the blade 24 and the upward intake action throughout its length is terminated by the vertically disposed radial flange 25 from which the cuttings are propelled outwards and upwards due to the centrifugal force exerted by the upper frusto conical member 22 so that they are ejected through the outlet port 15.

The operation as a snow remover is dependent on the lateral force exerted by rotation of the blade 24 attached to the lower frusto conical member 23, thereby providing a suction affect, due to the increasing width of the blade 24, through the lower entry port 14 in the side wall 11; the rotary action of the blade 24 provides for upward movement of the snow, after which it strikes the vertically disposed flange 25 from where it is moved outwards and upwards for ejection through the outlet port 15 due to the centrifugal force exerted by the upper frusto conical member 22.

From the foregoing construction and operation of the device it will be understood that modifications and changes will readily occur to those skilled in the art and it is not

What I claim is:

1. A mobile device for use as a lawn mower or a snow remover comprising a housing having a side wall, a top wall closing the top of said housing and an open bottom, wheels secured to the lower part of said housing, a handle secured to said housing for propelling same along the ground, an inlet port in the lower side of said housing and an upper outlet port in said housing, a power source attached to said housing, a rotatable shaft operatively connected to said power source extending into said housing, an upper inverted frusto conical member axially disposed of said shaft and connected thereto, a lower frusto conical member secured to said upper frusto conical member and having a common axis, the base of said lower frusto conical member being substantially in the same plane as said bottom opening, a blade spirally mounted on the surface of said lower frusto conical member extending substantially from its base to its junction with said upper frusto conical member and a substantially vertical radial flange attached to the outer surface of said upper frusto conical member, the base of said flange being adjacent to the upper end of said blade, said flange and said blade being clear of said housing for free rotation.

2. A claim according to claim 1 wherein the clearance between said flange and the side of said housing is greater than the clearance between said blade and the side of said housing.

3. A claim according to claim 1 wherein the horizontal distance of the edge of said blade from the axis of said lower frusto conical member remains substantially constant.

4. A claim according to claim 1 wherein the horizontal distance of the edge of said flange from the axis of said upper frusto conical member is at least equal to the horizontal distance between the edge of said blade from the axis of said lower frusto conical member.

5. A mobile device for use as a lawn mower or a snow remover comprising a housing having a side wall, a top wall closing the top of said housing and an open bottom, wheels secured to the lower part of said housing, a handle secured to said housing for propelling same along the ground, an inlet port in the lower side of said housing and an upper outlet port in said housing, a power source attached to said housing, a rotatable shaft operatively connected to said power source extending into said housing, an upper inverted frusto conical member axially disposed of said shaft and connected thereto, a substantially vertical radial flange attached to the outer surface of said upper frusto conical member, a lower frusto conical member secured to said upper frusto conical member and having a common axis, the base of said lower frusto conical member being substantially in the same plane as said bottom opening, a blade spirally mounted on the surface of said lower frusto conical member extending substantially from its base to its junction with said upper frusto conical member, the angular relationsip of the axis of said lower frusto conical member with a line taken from any point of the edge of said blade across its upper surface being substantially constant, said blade being located anywhere between the position where said line is substantially parallel to the base of said lower frusto conical member and a position where it is substantially normal to the surface of said lower frusto conical member.

6. A claim according to claim 5 wherein the clearance between said flange and the side of said housing is greater than the clearance between said blade and the side of said housing.

7. A claim according to claim 5 wherein the horizontal distance of the edge of said blade from the axis of said lower frusto conical member remains substantially constant.

8. A claim according to claim 5 wherein the horizontal distance of the edge of said flange from the axis of said upper frusto conical member is at least equal to the horizontal distance between the edge of said blade from the axis of said lower frusto conical member.

References Cited by the Examiner

UNITED STATES PATENTS

| | | | |
|---|---|---|---|
| 155,007 | 9/74 | Churchman | 37—43 |
| 1,616,835 | 2/27 | Wagoner | 37—43 |
| 2,787,064 | 4/57 | Schiller | 37—43 |
| 3,103,077 | 9/63 | Bennett | 56—25.4 X |
| 3,142,913 | 8/64 | Jacob | 37—43 |

ANTONIO F. GUIDA, *Acting Primary Examiner.*

T. GRAHAM CRAVER, *Examiner.*